Dec. 10, 1968  E. CAVIGLIA  3,414,938
PLASTIC PROCESSING SYSTEM
Original Filed Jan. 4, 1965  2 Sheets-Sheet 1
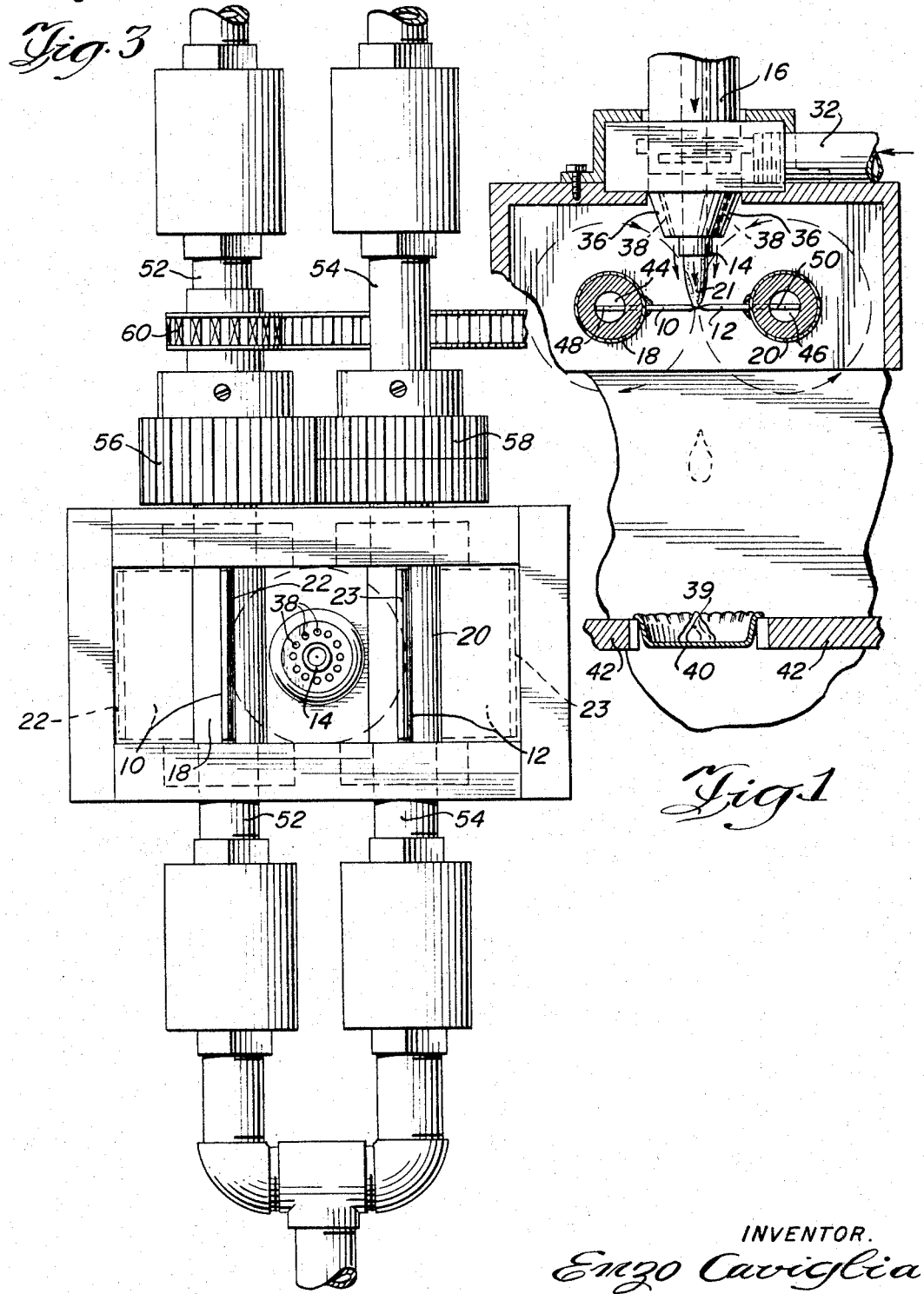
INVENTOR.
Enzo Caviglia
BY Dressler, Goldsmith, Clement, Gordon & Lobl
ATTORNEYS.

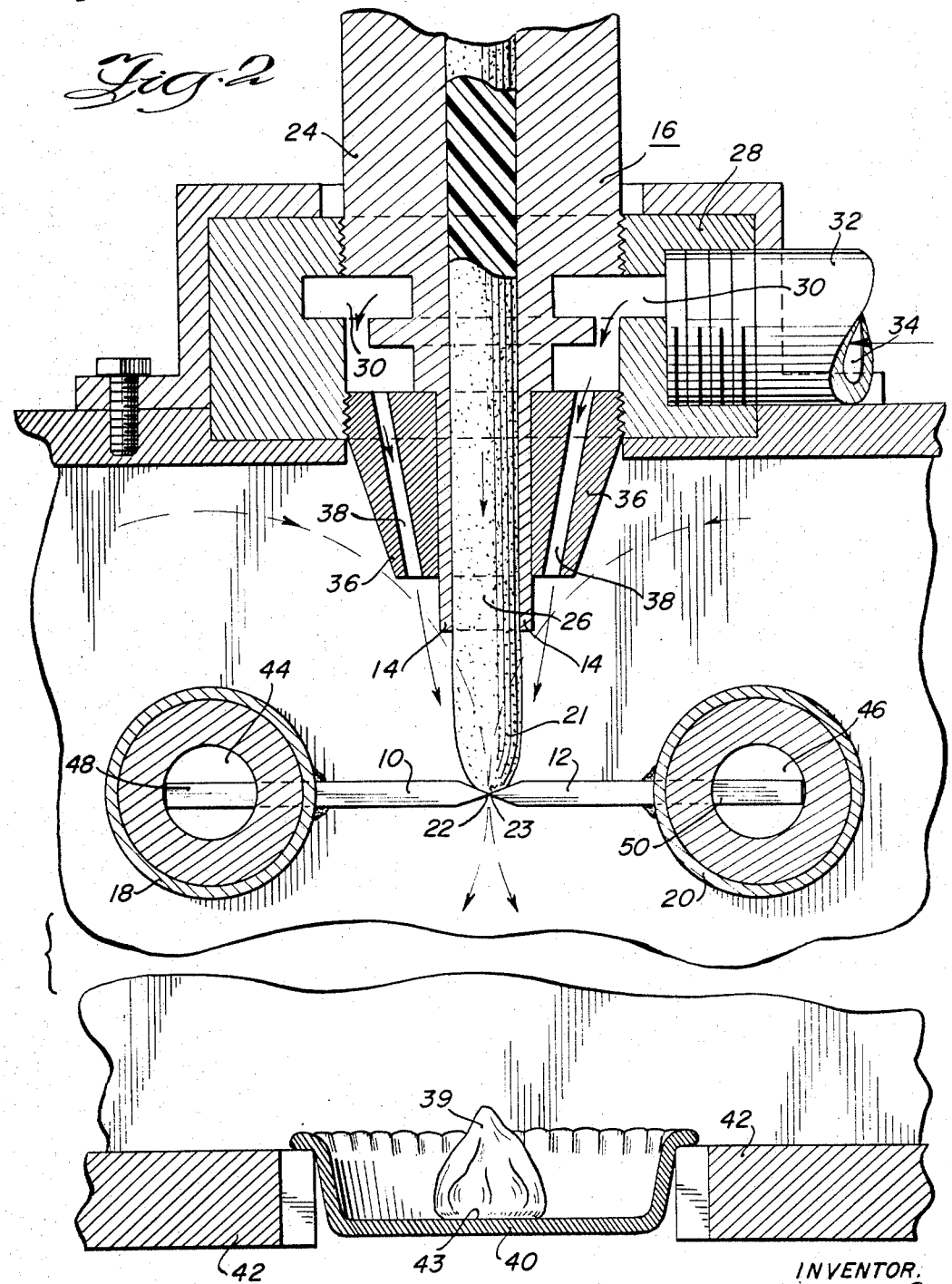

United States Patent Office 3,414,938
Patented Dec. 10, 1968

3,414,938
PLASTIC PROCESSING SYSTEM
Enzo Caviglia, Crawfordsville, Ind., assignor to The Hoosier Crown Corporation, a corporation of Indiana
Continuation of application Ser. No. 423,031, Jan. 4, 1965. This application Feb. 15, 1968, Ser. No. 705,857
6 Claims. (Cl. 18—5)

ABSTRACT OF THE DISCLOSURE

A metering type depositing apparatus is shown for providing a measured charge of hot plastic material in successive crown caps as the caps are conveyed along a receiving path by a synchronously running crown sprocket. An extruder has an outlet spaced above the path and pointed downwardly to feed a rod of hot plastic material at a timed rate along a vertical extrudate path and metering mechanism operates in synchronized relation with the crown sprocket and includes a pair of counter-rotating cutting blades spaced above the crown sprocket, each blade having a horizontal axis of rotation positioned on an opposite side of the extrudate path, the blades being arranged to effect mutual downwardly swinging travel through corresponding sides of the rod for cooperatively severing and propelling the rod material into each successive crown cap. The extruder has air conduits providing vertical air streams around the extrudate path to assist in propelling the severed rod material into each cap and the blades are carried in internally cooled drive shafts to cool the blades and prevent sticking of the rod material.

---

This application is a continuation of Ser. No. 423,031, now abandoned.

This invention relates to a plastic processing system, and more particularly, to a system for cutting accurately measured amounts of an extrudate in plastic form.

In high speed molding operations, there is a great need for a system that achieves rapid cutting of precisely measured amounts of hot plastic, and particularly for a system which combines rapid cutting with accurate direction of the cut plastic to a specific zone for further processing. There are several known systems for measuring accurate amounts of hot plastic. For example, one type of system utilizes intermittent extrusion by means of a reciprocating plunger within the extruder. However, these systems have operated too slowly for full utilization of molding capacity and have not provided accurate direction of the cut plastic to a specific receiving area.

The present invention obviates the abovementioned disadvantage. The illustrative embodiment of the invention has superior utility in the production of crown caps, where a plastic interior liner, molded in the cap, is utilized instead of cork. In the production of such plastic lined crown caps, it is necessary that hot plastic slugs of uniform size be provided and be accurately directed into the caps, while the caps move into the receiving zone at a relatively high speed. This invention provides precisely measured and accurately directed plastic slugs, in an efficient and advantageous manner.

Although the illustrative embodiment pertains to the metering of hot plastic in conjunction with crown cap production, it is to be understood that the principles of the invention can be employed in many other molding operations and that the invention is not to be limited to crown cap production.

In accordance with the invention, the hot plastic is first extruded. The extruded plastic is then cut with synchronous counter-rotating blades, rotating on axes transverse the extrudate path at a speed that is inversely proportional to the desired size of the cut plastic slugs.

In a preferred aspect of the invention air jets are directed about the extrudate path to form an air tunnel to direct the hot plastic slugs vertically downwardly into the receiving zone. In accordance with another preferred aspect, the cutting blades are cooled during the cutting operation to prevent the plastic from clinging or sticking to the blades.

A more detailed explanation of the invention is provided in the following description and is illustrated in the accompanying drawings in which:

FIGURE 1 is a fragmentary elevational view, taken partially in section, of a metering apparatus utilizing the principles of the present invention;
FIGURE 2 is an enlarged sectional view thereof; and
FIGURE 3 is a bottom view of the metering apparatus.

In the illustrative embodiment of the invention, a pair of synchronous, counter-rotating cutting blades 10 and 12 are disposed below the outlet 14 of an extruder nozzle 16. Blades 10 and 12 are connected to shafts 18 and 20 respectively, the axes of the shafts being transverse the path of the extrudate 21. The blades are positioned so that when they are disposed toward one another in horizontal alignment (as shown in FIGURES 1 and 2) the edge 22 of blade 10 and edge 23 of blade 12 substantially meet along a line which passes through the central axis of nozzle outlet 14.

Extruder nozzle 16 includes a pipe 24 having a channel 26 which communicates at one end with the extruder channel and which forms the outlet recess at the other end. A sleeve 28 threadedly engages pipe 24 and forms an air chamber 30 therewith, and an air inlet pipe 32 having an opening 34 in communication with channel 30 is connected to sleeve 28. Threadedly engaging the sleeve 28 is a fitting 36 defining twelve equally spaced, circularly disposed conduits 38 which communicate with air channel 30.

As compressed air is supplied via pipe 32 it is directed through conduits 38 and downwardly therefrom in the direction of the arrows (FIGURES 1 and 2). The air forms a tunnel which surrounds the extruded plastic 21 and guides it vertically downwardly so that the cut plastic slug 39 will be accurately seated upon a receiving device which is positioned vertically below outlet 14.

In the illustrative embodiment, the cut plastic slugs are directed to crown caps 40 which are supported on a conveyor 42. Conveyor 42 positions approximately 800 crown caps per minute under the extruder nozzle 16. Since the crown caps are only about one inch in diameter, it is apparent that accurate direction of the cut plastic slugs is necessary. Otherwise, the hot cut plastic could land in an area other than the central area 43 of the crown cap and the cap liner processing mechanism could be damaged in addition to the caps not having a proper lining.

In the lining of crown caps, it is expeditious to convey the crown cap with a hot plastic slug seated therein to a molding device, without the necessity of reheating the plastic between the time it is directed into the crown cap and the time it reaches the molding device. It is thus necessary to extrude and cut plastic which is heated to a high temperature, for example, 400° F. when the plastic is polyethylene. When hot plastic of this kind is cut by blades, there is a tendency for some of the plastic to cling or stick to the blades.

Several undesirable consequences can result from such clinging or adherence of the hot plastic to the blades. For example, the plastic may balk and be released subsequent to the short period of time that a crown cap is directly thereunder. Or there may be an accumulation of hot plastic, causing clogging of the system or uneven slugs.

In accordance with one preferred aspect of this invention, it has been found that cooling of the cutting blades obviates adherence of the plastic and for this purpose a fluid cooling system is provided. Shafts 18 and 20 define axially extending channels 44 and 46 respectively, and the cutting blades are connected to the shafts so that end portions 48 and 50 of blades 10 and 12 respectively are located within the channels for fluid contact. As illustrated in FIGURE 3, pipes 52 and 54 carrying cooling fluid, such as cold water, are connected to shafts 18 and 20 respectively. Blades 10 and 12, which are preferably composed of steel, are thereby in heat exchange relationship with the cooling fluid, and the temperature of the blades is kept low enough so that hot plastic will not stick thereto.

Shafts 18 and 20 have connected thereto engaging gears 56 and 58 respectively. Gear 56 is driven by a chain 60 which is connected to a suitable motor. Movement of chain 60 will cause counter-rotation of the gears and their respective shafts.

In the operation of the system, the hot plastic, for example polyethylene, is extruded through a suitable extruding device and passed downwardly via recess 26. After the plastic exits the nozzle it is cut by synchronous, counter-rotating blades 10 and 12 and the cut plastic slug is directed vertically downwardly to a crown cap which is passing underneath, carried by a synchronous conveyor. The cap, with the hot plastic slug seated therein, is conveyed for further processing.

The foregoing system provides accurately metered amounts of plastic at a very rapid rate, and the cut slugs of plastic are accurately directed to a receiving area.

In a specific embodiment, 3/16 inch diameter low density polyethylene at a temperature of 400° F., was cut into 200 mg. slugs at a speed of 800 slugs per minute, and the slugs were directed to the center of crown caps which were passing underneath at a rate of 800 caps per minute.

Although a specific embodiment has been described, it is to be understood that the present invention can be utilized where plastic having a higher or lower temperature is to be metered at a slower or faster rate, and where the plastic is to be directed to other receiving means than crown caps.

Other modifications and substitutions may become apparent in view of this disclosure. For example, a plurality of blades, instead of only one blade could be connected to each shaft. Instead of a plurality of conduits 38, an air passage comprising an annulus defined by a fitting could be provided. It is intended to cover by the appended claims all modifications and embodiments that fall within the spirit and scope of the invention.

What is claimed is:

1. In a metering type charge depositing apparatus that includes a synchronous conveyor advancing a plurality of open-topped receiving devices at a predetermined feed rate and in predetermined spaced relation along a receiving path, extruder means having an outlet spaced vertically above and pointed substantially vertically toward said receiving path for progressively feeding a rod of hot plastic material downwardly along a vertical extrudate path at a rate proportional to said feed rate, and metering mechanism operating in synchronized relation with said conveyor and including a pair of counter-rotating cutting blades spaced above said receiving path, each blade having a horizontal axis of rotation positioned on an opposite side of the extrudate path, said metering mechanism being constructed and arranged to effect mutual downwardly swinging travel of said pair of blades through corresponding sides of said rod at a blade velocity for cooperatively severing and propelling each successive rod portion into each successive receiving device at a predetermined point along said receiving path.

2. In apparatus in accordance with claim 1 and wherein said apparatus includes means for providing a downwardly directed curtain of air about said rod for assisting said blades in propelling each severed rod portion into each corresponding receiving device.

3. In apparatus in accordance with claim 1 and wherein said extruder means includes a nozzle provided with said outlet and having a plurality of internally intercommunicating conduits opening therefrom in vertically downwardly directed relation surrounding said outlet, and means for supplying compressed air to said nozzle for discharge from said conduits to assist said blades in propelling each severed rod portion into each corresponding receiving device.

4. In apparatus in accordance with claim 1 and wherein said apparatus includes means for cooling said blades to prevent sticking of the rod material thereto and thereby permit said blades to propel each severed rod portion into each corresponding receiving device.

5. In apparatus in accordance with claim 1 and wherein each rotating blade includes a rotary mounting shaft having an axially extending internal channel and having a blade anchorage portion projecting in sealed relation thereinto and means for flowing a cooling liquid through said internal channels during rotation of said shafts to cool said blades by contact with said blade anchorage portions.

6. In a metering type charge depositing apparatus that includes a synchronous conveyor for advancing a plurality of open-topped receiving devices at a predetermined feed rate and in predetermined spaced relation along a receiving path, extruder means for progressively feeding a rod of hot plastic material above said path at a rate proportional to said feed rate, and metering means operating in synchronized relation with said conveyor and said extruder means for successively severing the rod to deposit a separate portion in each receiving device, the improvement wherein the extruder means has an outlet spaced vertically above and pointed substantially vertically toward said receiving path to extrude the rod along a vertical extrudate path and wherein the metering means includes a pair of cutting blades spaced above said receiving path, each blade having a horizontal axis of rotation positioned on an opposite side of the extrudate path, and synchronous drive means counter-rotating said pair of blades to effect mutual downwardly swinging travel of said pair of blades through corresponding sides of said rod at a blade velocity for cooperatively severing and propelling each successive rod portion along a trajectory to deposit in each successive receiving device at a predetermined point along said receiving path.

References Cited
UNITED STATES PATENTS

| | | | |
|---|---|---|---|
| 1,900,434 | 3/1933 | Desautels | 18—12 |
| 2,772,012 | 11/1956 | Crabtree | |
| 3,135,019 | 6/1964 | Aichele. | |
| 3,213,170 | 11/1965 | Erdmenger et al. | 18—12 X |

WILLIAM J. STEPHENSON, *Primary Examiner.*

U.S. Cl. X.R.

18—4, 30, 12